United States Patent
Kim et al.

(10) Patent No.: US 8,049,831 B2
(45) Date of Patent: Nov. 1, 2011

(54) LIQUID CRYSTAL DISPLAY

(75) Inventors: Hyojin Kim, Kyungbuk (KR); Hyunki Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 381 days.

(21) Appl. No.: 12/318,518

(22) Filed: Dec. 30, 2008

(65) Prior Publication Data
US 2009/0322989 A1 Dec. 31, 2009

(30) Foreign Application Priority Data
Jun. 30, 2008 (KR) .......... 10-2008-0062853

(51) Int. Cl.
*G02F 1/1333* (2006.01)
*G02F 1/1335* (2006.01)
(52) U.S. Cl. .................. 349/58; 349/62; 349/65
(58) Field of Classification Search ......... 349/58–60, 349/62, 65
See application file for complete search history.

(56) References Cited

U.S. PATENT DOCUMENTS

| | | | |
|---|---|---|---|
| 5,659,376 A * | 8/1997 | Uehara et al. | 349/58 |
| 6,608,664 B1 * | 8/2003 | Hasegawa | 349/160 |
| 6,654,083 B1 * | 11/2003 | Toda et al. | 349/110 |
| 7,443,460 B2 * | 10/2008 | Park | 349/58 |
| 7,471,353 B2 * | 12/2008 | Oohira | 349/58 |
| 7,557,869 B2 * | 7/2009 | Bang et al. | 349/12 |
| 7,724,317 B2 * | 5/2010 | Kim et al. | 349/58 |
| 7,903,193 B2 * | 3/2011 | Oohira | 349/58 |
| 2006/0092345 A1 * | 5/2006 | Takeuchi | 349/60 |
| 2007/0097286 A1 * | 5/2007 | Oohira | 349/58 |
| 2008/0151138 A1 * | 6/2008 | Tanaka | 349/58 |
| 2009/0086124 A1 * | 4/2009 | Oohira | 349/60 |
| 2009/0231508 A1 * | 9/2009 | Sato et al. | 349/58 |

FOREIGN PATENT DOCUMENTS

CN 2329991 7/1999

* cited by examiner

*Primary Examiner* — Rhonda Peace
(74) *Attorney, Agent, or Firm* — McKenna Long & Aldridge LLP

(57) ABSTRACT

The liquid crystal display includes: a liquid crystal panel; a backlight unit that includes a light guide plate that is positioned at a lower part of the liquid crystal panel and that guides light emitted from a light source in a direction of the liquid crystal panel, and a plurality of optical sheets that provide light emitted from the light guide plate to the liquid crystal panel; and a plurality of step parts that are formed from a base surface to an upper surface in order to receive the liquid crystal panel and the backlight unit, wherein a step part facing the liquid crystal panel among the plurality of step parts includes a main support having an area patterned to be apart from the liquid crystal panel.

8 Claims, 5 Drawing Sheets

(a)  (b)

LIQUID CRYSTAL DISPLAY

This application claims the benefit of Korean Patent Application No. 10-2008-0062853 filed on Jun. 30, 2008, which is hereby incorporated by reference for all purposes as if fully set forth herein.

BACKGROUND

1. Field of the Invention

This document relates to a backlight unit and a liquid crystal display using the same.

2. Discussion of the Related Art

As an information-oriented technology develops, a market of a display device, which is a connection medium between a user and information increases. Accordingly, a use of a flat panel display (FPD) such as a liquid crystal display (LCD), an organic light emitting diode (OLED), and a plasma display panel (PDP) increases. The LCD that can embody high resolution and that can increase a size as well as decrease a size is widely used.

The LCD is produced by dividing into a small module mounted in a mobile phone, or a digital camera, etc. and a large module mounted in a television, or a monitor, etc. The LCD is classified into a light receiving display device. The LCD receives light emitted from a light source of a backlight unit positioned at a lower part of a liquid crystal panel and expresses an image.

The LCD is largely divided into a transistor array substrate and a color filter substrate. In the transistor array substrate, a transistor including a gate, a semiconductor layer, a source, and a drain, and a subpixel including a pixel electrode that is connected to the source or the drain of the transistor are formed. A color filter and a black matrix are formed in the color filter substrate.

The liquid crystal panel and the backlight unit included in the LCD are received by a main support and an upper support. The main support has a plurality of step parts to receive the liquid crystal panel and the backlight unit. Because a related art main support is designed so that a step part facing the liquid crystal panel among a plurality of step parts contacts with the liquid crystal panel, when an impact test is performed, while the liquid crystal panel is bent, a light guide part of the upper support is opened and a light guide part of the main support is opened and thus interference between the liquid crystal panel and the main support occurs. Accordingly, a damage (crack) frequently occurs from a central area of the liquid crystal panel.

SUMMARY OF THE INVENTION

Accordingly, the present invention is directed to a liquid crystal display that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an LCD includes: a liquid crystal panel; a backlight unit that includes a light guide plate that is positioned at a lower part of the liquid crystal panel and that guides light emitted from a light source in a direction of the liquid crystal panel, and a plurality of optical sheets that provide light emitted from the light guide plate to the liquid crystal panel; and a plurality of step parts that are formed from a base surface to an upper surface in order to receive the liquid crystal panel and the backlight unit, wherein a step part facing the liquid crystal panel among the plurality of step parts includes a main support having an area patterned to be apart from the liquid crystal panel.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to an embodiment of the present invention, example of which is illustrated in the accompanying drawings.

Figure 1:
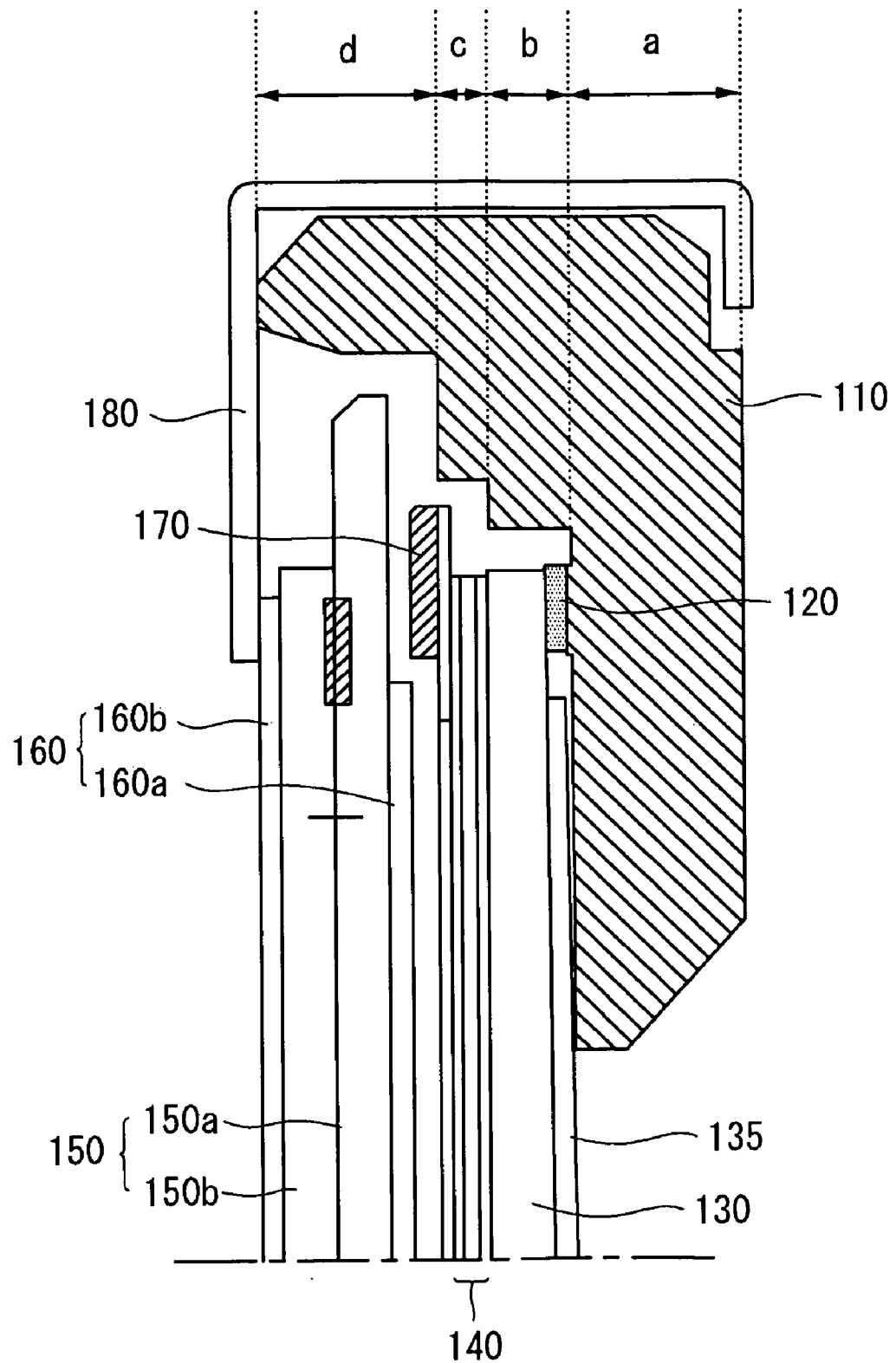
FIG. 1 is a partial cross-sectional view of an LCD according to an embodiment of the present invention.

As shown in FIG. 1, an LCD includes a liquid crystal panel 150. Further, the LCD includes backlight units 130 and 140 that include a light guide plate 130 that is positioned at a lower part of the liquid crystal panel 150 and that guides light emitted from a light source in a direction of the liquid crystal panel 150, and a plurality of optical sheets 140 for providing light emitted from the light guide plate 130 to the liquid crystal panel 150.

The LCD may include an adhesion member 120 for fixing the light guide plate 130 to one surface of the main support 110. The adhesion member 120 may use a double-sided tape to which an opaque material, for example, silver (Ag) or a black pigment is added.

Further, the LCD may include a reflective sheet 135 positioned between the light guide plate 130 and the main support 110. The LCD may use the reflective sheet 135 in which a diffusion material is formed in order to provide light emitted to the light guide plate 130 to a plurality of optical sheets 140 without loss.

Further, the LCD includes a black frame 170 for exposing a display area of the liquid crystal panel 150 and blocking a non-display area. The black frame 170 prevents light emitted from the plurality of optical sheets 140 from being leaked to the outside. In order to improve light blocking characteristics, the black frame 170 may include an opaque black-series material and may be formed using a single layer film or a multiple layer film. The black frame 170 may be a light blocking tape.

Further, the LCD may include a polarizing film 160 positioned at both surfaces of the liquid crystal panel 150. The polarizing film 160 may selectively include a plurality of films such as an anisotropic absorption shaft, a compensation film, and a zero retardation film according to a position in order to polarize light provided to the liquid crystal panel 150 and to emit only desired light in a direction of a display area.

Further, the LCD includes the liquid crystal panel 150 received in the main support 110 and an upper support 180 that protects the backlight units 130 and 140. The upper support 180 may have an opening to expose a display area of the liquid crystal panel 150 and a form bent in a "c" shape. The plurality of optical sheets 140 may include at least one of a diffusion sheet, a prism sheet, a lenticular lens sheet, a micro lens sheet, and a protection sheet, and in order to increase a diffusion coefficient, beads may be included in at least one of a diffusion sheet, a prism sheet, a lenticular lens sheet, a micro lens sheet, and a protection sheet.

Figure 2:
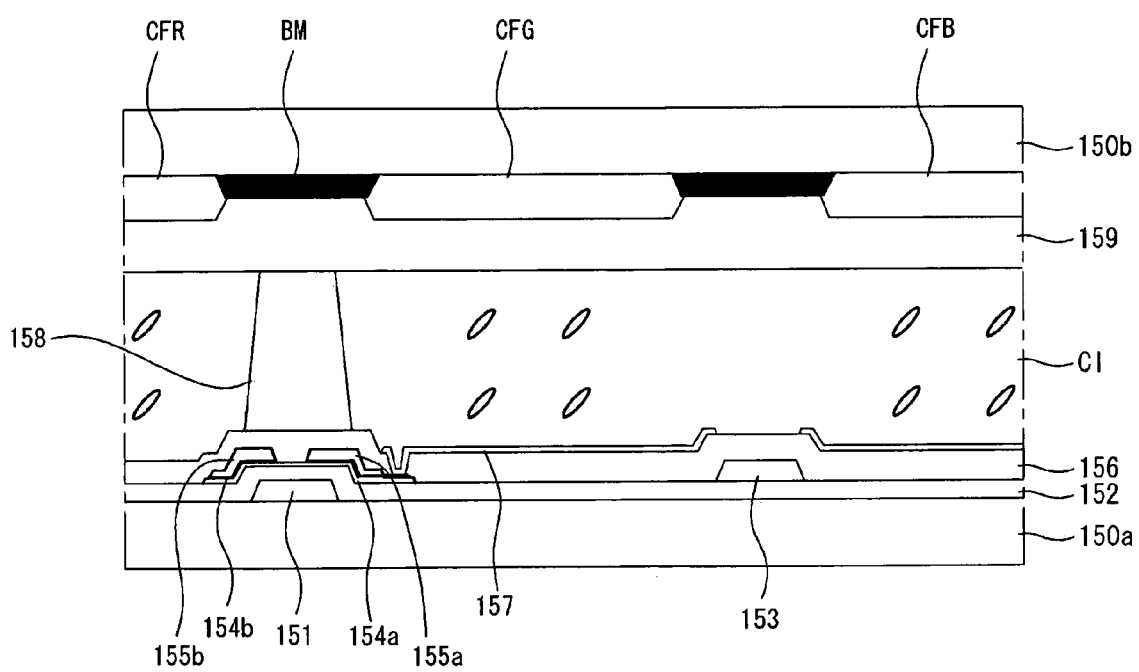
FIG. 2 is a schematic cross-sectional view of a liquid crystal panel shown in FIG. 1.

Referring to FIG. 2, the liquid crystal panel 150 is described in detail. A structure of the liquid crystal panel 150 shown in FIG. 2 is provided for a better understanding, and the liquid crystal panel 150 is not limited thereto.

The liquid crystal panel 150 may have a structure in which a first substrate 150a in which a thin film transistor is formed and a second substrate 150b in which a color filter is formed are coupled with a liquid crystal layer Cl interposed therebetween. According to characteristics of the liquid crystal layer Cl, an alignment film may be positioned in an upper part of the first substrate 150a and the second substrate 150b.

A gate 151 is positioned at one surface of the first substrate 150a. The gate 151 may be formed of, for example, molybdenum (Mo), aluminum (Al), chrome (Cr), gold (Au), titanium (Ti), nickel (Ni), neodymium (Nd), and copper (Cu), or alloys thereof. Further, the gate 151 may be formed of multiple layers, such as multiple layers of molybdenum (Mo), aluminum (Al), chrome (Cr), gold (Au), titanium (Ti), nickel (Ni), neodymium (Nd), and copper (Cu), or alloys thereof. For example, the gate 151 may be formed in a double layer of molybdenum/aluminum-neodymium or molybdenum/aluminum.

The first insulating film 152 is positioned on the gate 151. The first insulating film 152 may be a silicon oxide film (SiOx), a silicon nitride film (SiNx), or a multiple layer thereof, but is not limited thereto.

An active layer 154a is positioned at an area corresponding to the gate 151 on the first insulating film 152, and an ohmic contact layer 154b for lowering contact resistance is positioned at the active layer 154a. Further, a data wiring 153 for supplying a data voltage is positioned on the first insulating film 152, but a position of the data wiring 153 is not limited thereto.

A source 155a and a drain 155b are positioned on the active layer 154a. The source 155a and the drain 155b may be formed in a single layer or multiple layers, and when the source 155a and the drain 155b are formed in a single layer, the source 155a and the drain 155b may be formed of, for example, molybdenum (Mo), aluminum (Al), chrome (Cr), gold (Au), titanium (Ti), nickel (Ni), neodymium (Nd), copper (Cu), or alloys thereof. The source 155a and the drain 155b may be formed of multiple layers, such as multiple layers of molybdenum (Mo), aluminum (Al), chrome (Cr), gold (Au), titanium (Ti), nickel (Ni), neodymium (Nd), and copper (Cu), or alloys thereof. For example, the source 155a and the drain 155b may be formed in a double layer of molybdenum/aluminum-neodymium, or a triple layer of molybdenum/aluminum/molybdenum or molybdenum/aluminum-neodymium/molybdenum.

A second insulating film 156 is positioned on the source 155a and the drain 155b. The second insulating film 156 may be a silicon oxide film (SiOx), a silicon nitride film (SiNx), or a multiple layers thereof, but is not limited thereto. The second insulating film 156 may be a passivation film.

A pixel electrode 157 connected to the source 155a or the drain 155b is positioned on the second insulating film 156. The pixel electrode 157 may be a transparent electrode such as an indium tin oxide (ITO), an indium zinc oxide (IZO), or a zinc oxide (ZnO).

A common electrode (not shown) may be positioned opposite to the pixel electrode 157 on the second insulating film 156. The common electrode may be positioned on the first substrate 150a or the second substrate 150b.

A spacer 158 for sustaining a cell gap with the second substrate 150b is positioned on the second insulating film 156 that is positioned on the first substrate 150a and that corresponds to the source 155a and the drain 155b.

A black matrix BM is positioned at one surface of the second substrate 150b. The black matrix BM is positioned to correspond to a non-display area at which the spacer 158 is positioned. The black matrix BM may be made of a photosensitive organic material to which a black pigment is added, and the black pigment may use carbon black or titanium oxide, etc.

Color filters CFR, CFG, and CFB are positioned between the black matrixes BM. The color filters CFR, CFG, and CFB may have other colors as well as a red color CFR, a green color CFG, and a blue color CFB.

An overcoating layer 159 is positioned on the black matrix BM and the color filters CFR, CFG, and CFB. The second substrate 150b in which the black matrix BM and the color filters CFR, CFG, and CFB are formed may omit the overcoating layer 159 according to a structure thereof.

Although not shown in FIG. 2, a driver including a scan driver and a data driver for supplying a driving signal to the liquid crystal panel 150 is positioned at the first substrate 150a.

The driver is connected to the data wiring 153 and a gate wiring formed on the first substrate 150a for forming the liquid crystal panel 150. A film circuit in which the driver is mounted is connected to the liquid crystal panel 150 with a chip on film (COF) method or a tape carrier package (TCP) method. However, the driver may be directly mounted on the first substrate 150a with a chip on glass (COG) method, or may be formed on the first substrate 150a in a thin film transistor formation process.

The liquid crystal panel 150 formed in this way can display an image in each subpixel according to a scan signal supplied through gate wirings and a data voltage supplied through data wirings.

The scan signal may be a pulse signal in which a gate high voltage supplied for one horizontal time period and a gate low voltage supplied for the remaining time period are alternately supplied, but is not limited thereto. When a gate high voltage is supplied from the gate wirings, a thin film transistor included in the subpixel is turned on to supply a data voltage applied from the data wirings to the liquid crystal layer Cl.

Accordingly, when the thin film transistor of each subpixel is turned on and a data voltage are thus applied to the pixel electrode 157, a difference voltage between a data voltage and a common voltage is charged to the liquid crystal layer Cl, and thus the liquid crystal panel 150 can display an image.

In contrast, when a gate low voltage is supplied from gate wirings, as the thin film transistor is turned off, a data voltage charged to the liquid crystal layer Cl may be sustained for one frame period by a storage capacitor. The liquid crystal panel 150 may repeat different operations according to a scan signal supplied through the gate wirings.

Figure 3:
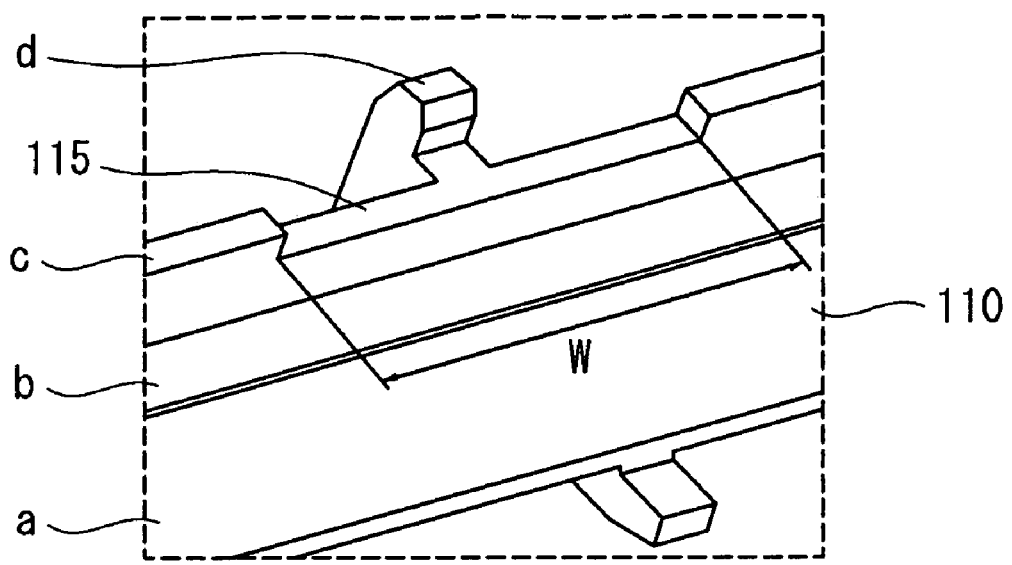
FIG. 3 is a partial perspective view of a main support shown in FIG. 1.

The main support 110 is described hereinafter in detail with reference to FIGS. 1 and 3. For a better understanding of description, FIG. 3 shows a partial area with a perspective view.

Referring to FIG. 1, as described above, the main support 110 includes a plurality of step parts a, b, c, and d formed from a base surface to an upper surface. The plurality of step parts a, b, c, and d include a first step part a, a second step part b, a third step part c, and a fourth step part d. The third step part c is formed so that an area facing the liquid crystal panel 150 is disposed apart. The first step part a supports the reflective sheet 135 and the light guide plate 130, the second step part b supports the optical sheet 140, the third step part c supports the liquid crystal panel 150, and the fourth step part d supports the upper support 180. The fourth step part d may be a rip part.

In order to separate the liquid crystal panel 150 and the main support 110 from each other, the third step part c facing the liquid crystal panel 150 has an area 115 patterned to be depressed. The patterned area 115 may be depressed in a substantially rectangular form. Further, the patterned area 115 may have a width W narrower than that of a surface of the third step part c.

The patterned area 115 is positioned at a rip part area positioned at the center of the main support 110. The reason for forming the patterned area 115 in a rip part area of the main support 110 is that a central area of the liquid crystal panel 150 is frequently damaged (cracked) when the main support 110 and the upper support 180 are manufactured in a module form by coupling and an impact test that applies an external force to the module is performed.

Figure 4:
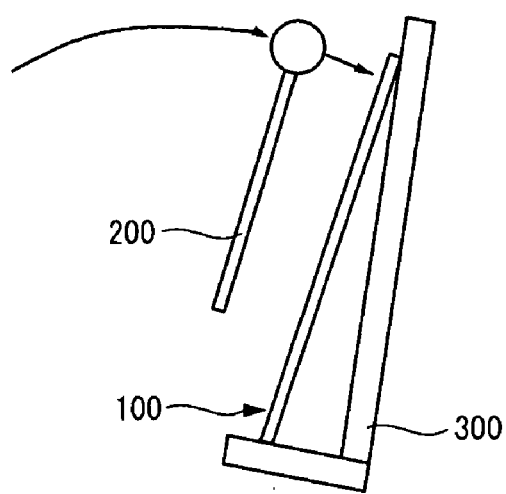
FIG. 4 is a view illustrating an impact test of a liquid crystal display module.

As shown in FIG. 4, an impact test is performed by putting the liquid crystal display module 100 in a mount 300 and applying an impact corresponding to a predetermined weight with a push pull gauge or a cotton hammer 200 to the liquid crystal display module 100. The impact test method may be performed on a portion basis by dividing into an area such as an upper portion of a rip part of the liquid crystal display module 100.

Figure 5:
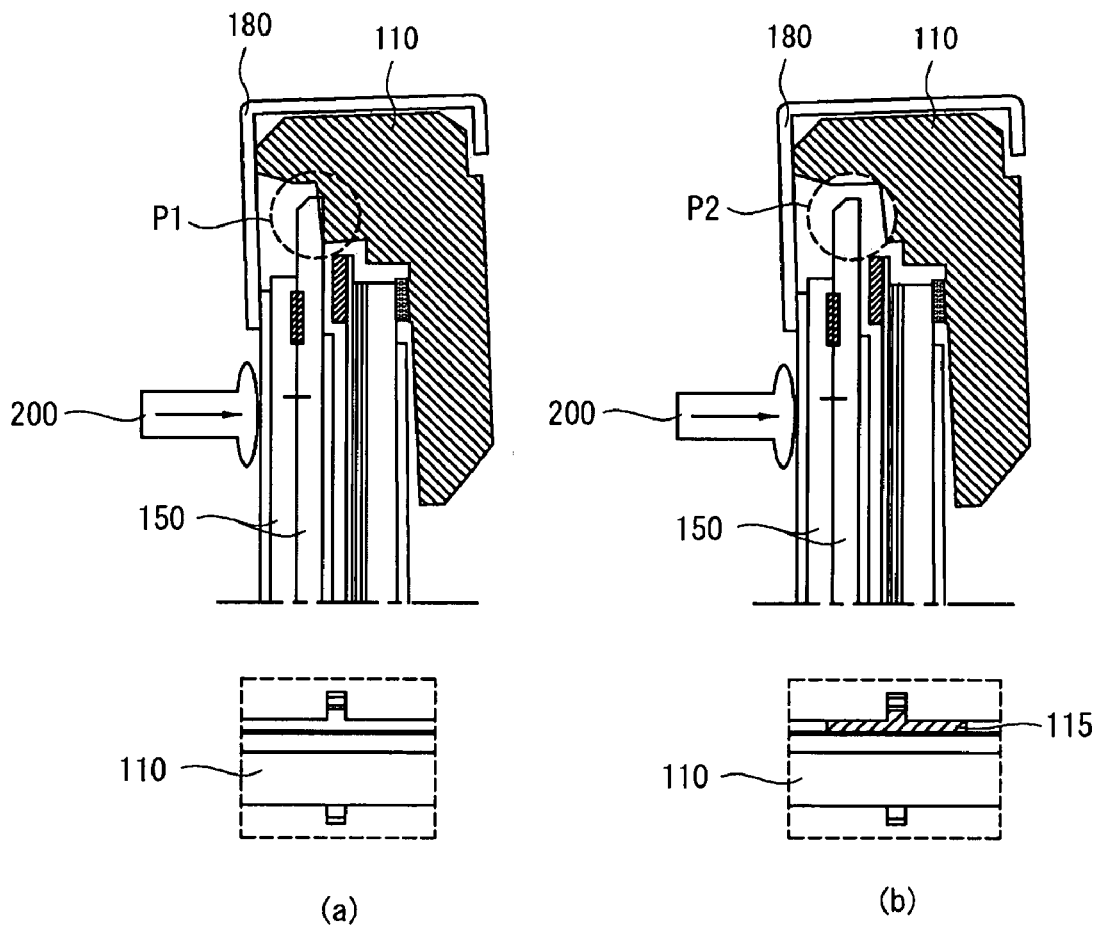
FIG. 5 is a view comparing the change within a liquid crystal display module by an impact test.

Referring to FIG. 5, when the impact test of FIG. 4 was performed, in a case of FIG. 5(a), while the liquid crystal panel 150 is bent, as the upper support 180 and the main support 110 are opened, interference occurs between the liquid crystal panel 150 and the main support 110 and thus a damage (crack) occurs from a central area of the liquid crystal panel 150 (see P1).

When the impact test of FIG. 4 was performed, in a case of FIG. 5(b), while the liquid crystal panel 150 is bent, even if the upper support 180 and the main support 110 are opened, interference does not occur between the liquid crystal panel 150 and the main support 110 and thus the liquid crystal panel 150 is not damaged (cracked) (see P2).

As an experiment result, in a structure of FIG. 5(a), upon an impact test, the liquid crystal panel 150 was damaged by an impact corresponding to about 6 kg, but in a structure of FIG. 5(b), upon an impact test, even if an impact corresponding to about 16 kg is applied, the liquid crystal panel 150 was not damaged.

Figure 6:
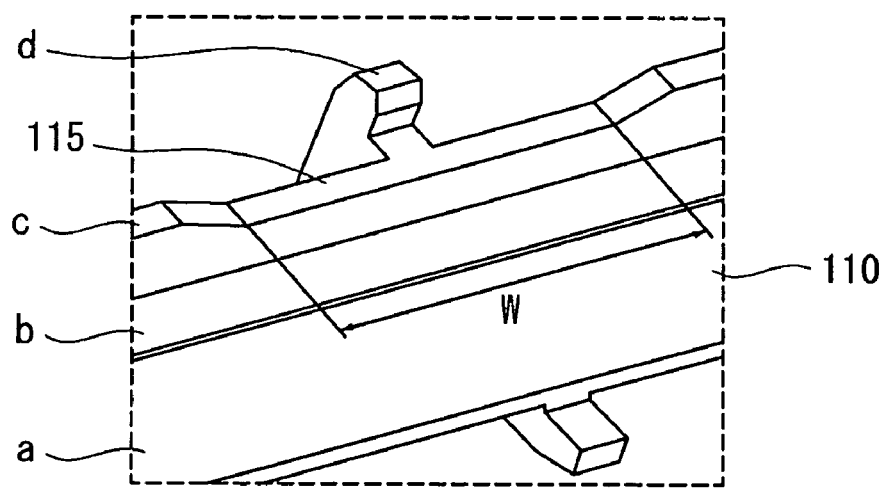
FIGS. 6 to 8 are various perspective views of a main support according to a modified embodiment.

A shape of the main support 110 is not limited thereto and may be formed in a form of FIG. 6.

Referring to FIG. 6, the patterned area 115 positioned at a central rip part area of the main support 110 is depressed in a substantially rectangular form, and a surrounding area of the patterned area 115 may have an inclined slope surface. Further, the third step part c formed in the main support 110 of FIG. 6 may have a height equal to or lower than that of the black frame 170.

Figure 7:
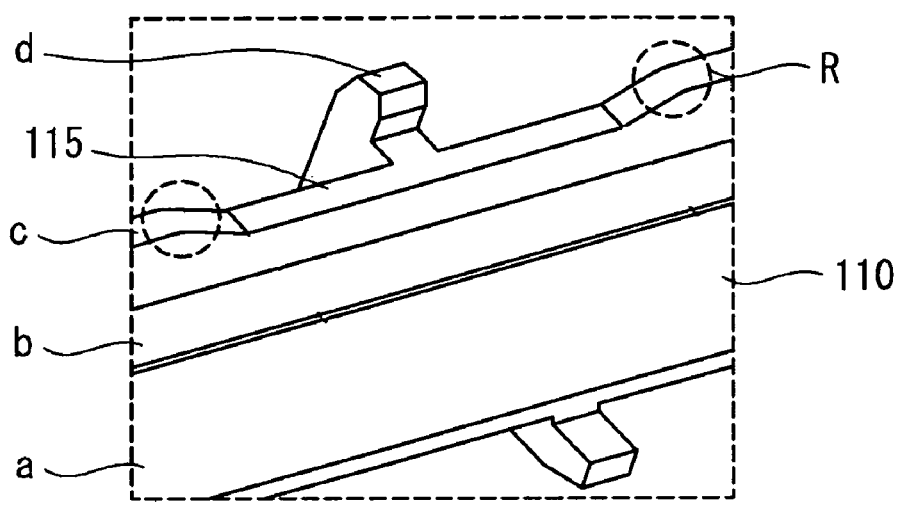

Referring to FIG. 7, the patterned area 115 positioned at a central rip part area of the main support 110 is depressed in a substantially rectangular form, and an upper corner area of an inclined slope surface positioned at a surrounding area of the patterned area 115 may have a round shape R. In this case, because an upper corner area of both slope surfaces of the patterned area 115 is formed in a round shape R, upon an impact test, a degree of an impact transferred to the liquid crystal panel may be mitigated. Further, the third step part c formed in the main support 110 of FIG. 7 may have a height equal to or lower than that of the black frame 170.

Figure 8:
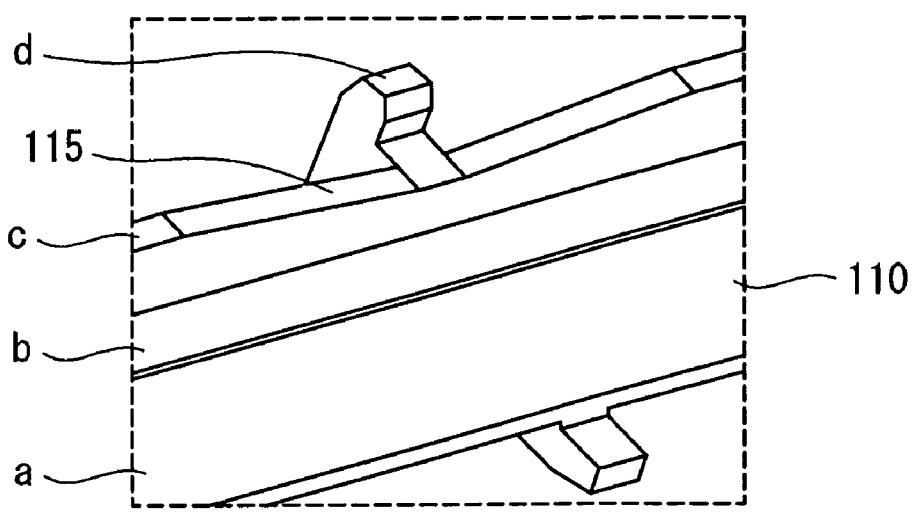

Referring to FIG. 8, the patterned area 115 positioned at a central rip area of the main support 110 may have a slope surface inclined toward the center of the patterned area 115. In such a structure, an upper corner area of both slope surfaces of the patterned area 115 may be formed in a round shape, as shown in FIG. 7. Further, the third step part c formed in the main support 110 of FIG. 8 may have a height equal to or lower than that of the black frame 170.

As described above, by improving a step part structure of a main support that receives a liquid crystal panel with a lower cost, upon an impact test, an LCD that can solve a problem that a liquid crystal panel is damaged (cracked) by an external force is provided. Therefore, by improving a damage (crack) resisting force to an external force, an LCD stronger on an impact than a related art LCD is provided. Further, by changing a step part structure of a main support, an LCD that can satisfy an impact test specification requested by a buyer is provided.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) comprising:
    a liquid crystal panel;
    a backlight unit that comprises a light guide plate that is positioned at a lower part of the liquid crystal panel and that guides light emitted from a light source in a direction of the liquid crystal panel, and a plurality of optical sheets that provide light emitted from the light guide plate to the liquid crystal panel; and
    a plurality of step parts that are formed from a base surface to an upper surface in order to receive the liquid crystal panel and the backlight unit,
    wherein a step part facing the liquid crystal panel among the plurality of step parts comprises a main support having an area patterned to be apart from the liquid crystal panel,
    wherein the plurality of step parts comprise a first step part to support a reflective sheet and the light guide plate, a second step part to support the optical sheets, a third step part to support the liquid crystal panel and a fourth step part to support an upper support,
    wherein the patterned area is a rip area that is positioned at the center of the main support, wherein the patterned area has a depressed pattern, the patterned area formed at the third step part.

2. The LCD of claim 1, wherein the patterned area is depressed in a rectangular form.

3. The LCD of claim 2, wherein a surrounding area of the patterned area has an inclined slope surface.

4. The LCD of claim 3, wherein an upper corner area of the inclined slope surface has a round shape.

5. The LCD of claim 1, wherein the patterned area has a slope surface inclined toward the center of the patterned area.

6. The LCD of claim 1, wherein a width of the patterned area is narrower than that of a surface of a step part facing the liquid crystal panel.

7. The LCD of claim 1, wherein a black frame for exposing a display area of the liquid crystal panel and blocking a non-display area thereof is positioned between the liquid crystal panel and the plurality of optical sheets.

8. The LCD of claim 7, wherein a height of the patterned area is equal to or lower than that of the black frame.

* * * * *